(12) United States Patent
Sun et al.

(10) Patent No.: US 11,252,579 B2
(45) Date of Patent: Feb. 15, 2022

(54) ELECTRONIC DEVICE, SPECTRUM MANAGEMENT METHOD, AND CONTROL METHOD

(71) Applicants: Sony Corporation, Tokyo (JP); Chen Sun, Beijing (CN)

(72) Inventors: Chen Sun, Beijing (CN); Xin Guo, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/980,431

(22) PCT Filed: Mar. 11, 2019

(86) PCT No.: PCT/CN2019/077580
§ 371 (c)(1),
(2) Date: Sep. 14, 2020

(87) PCT Pub. No.: WO2019/174531
PCT Pub. Date: Sep. 19, 2019

(65) Prior Publication Data
US 2021/0006983 A1    Jan. 7, 2021

(30) Foreign Application Priority Data

Mar. 15, 2018 (CN) .......................... 201810213985.4

(51) Int. Cl.
*H04W 16/14* (2009.01)
*H04B 17/345* (2015.01)
*H04B 17/382* (2015.01)

(52) U.S. Cl.
CPC .......... *H04W 16/14* (2013.01); *H04B 17/345* (2015.01); *H04B 17/382* (2015.01)

(58) Field of Classification Search
CPC ..... H04W 16/10; H04W 16/14; H04W 72/00; H04W 72/04; H04W 72/0453;
(Continued)

(56) References Cited

U.S. PATENT DOCUMENTS

| 8,699,444 B2 | 4/2014 | Steer et al. |
| 2013/0295948 A1* | 11/2013 | Ye .......................... H04W 74/06 455/452.1 |

(Continued)

FOREIGN PATENT DOCUMENTS

| CN | 103581920 A | 2/2014 |
| CN | 107371165 A | 11/2017 |

OTHER PUBLICATIONS

Singh et al.,"Coordination protocol for inter-operator spectrum sharing in co-primary 5G small cell networks", IEEE Communications Magazine, Jul. 2015, 7 pages (Year: 2015).*

(Continued)

*Primary Examiner* — Quoc Thai N Vu
(74) *Attorney, Agent, or Firm* — Xsensus LLP

(57) ABSTRACT

The present disclosure relates to an electronic device, a spectrum management method, and a control method. According to one embodiment, an electronic device used for spectrum management comprises a processing circuit. The processing circuit is configured to acquire the interference relationships between radio access nodes managed by a first level spectrum management device, said radio access nodes comprising radio access nodes managed respectively by different second level spectrum management devices. The processing circuit is further configured to allocate, based on the acquired interference relationships, multiplex spectrum resources to radio access nodes that do not interfere with each other, and orthogonal spectrum resources to radio access nodes that do interfere with each other.

13 Claims, 14 Drawing Sheets

(58) Field of Classification Search
CPC ............ H04W 72/0426; H04W 72/082; H04B 17/345; H04B 17/382; H04L 5/0007; H04L 5/023
See application file for complete search history.

(56) References Cited

U.S. PATENT DOCUMENTS

2014/0128088 A1* 5/2014 Farhadi ................ H04W 24/02
455/452.1
2018/0014304 A1 1/2018 Khoshnevisan

OTHER PUBLICATIONS

International Search Report and Written Opinion dated Jun. 12, 2019 for PCT/CN2019/077580 filed on Mar. 11, 2019, 9 pages including English Translation of the International Search Report.

* cited by examiner

ELECTRONIC DEVICE, SPECTRUM MANAGEMENT METHOD, AND CONTROL METHOD

CROSS-REFERENCE TO RELATED APPLICATIONS

The present application is based on PCT filing PCT/CN2019/077580, filed Mar. 11, 2019, which claims priority to CN 201810213985.4, filed Mar. 15, 2018, the entire contents of each are incorporated herein by reference.

FIELD OF THE INVENTION

The present disclosure relates generally to the field of wireless communications. More specifically, it relates to an electronic device for spectrum management, a spectrum management method, an electronic device for a wireless access node, a control method for a wireless access node, and a computer-readable medium.

BACKGROUND OF THE INVENTION

With the development of wireless communication systems, users are increasingly demanding services of high quality, high speed, and new services. Wireless communication operators and equipment manufacturers must continuously improve the system to meet the users' requirements. This requires a large amount of spectrum resources (which can be quantified by parameters such as time, frequency, bandwidth, and allowable maximum transmit power) to support new services and meet high-speed communication demands. Limited spectrum resources have been allocated to fixed operators and services, and new available spectrum is either very scarce or expensive. In this case, people have proposed the concept of dynamic spectrum utilization, i.e., dynamically utilizing those spectrum resources that have been allocated to certain services but are not fully utilized. For example, the spectrum of some channels that are not broadcasting programs on the digital television broadcasting spectrum or the spectrum of adjacent channels is dynamically utilized to perform wireless mobile communications without interfering with television signal reception.

Taking the digital television broadcasting spectrum as an example, since the television broadcasting spectrum itself is allocated for use by a television broadcasting system, the television broadcasting system is a primary system, and a television is a primary user. A mobile communication system is a secondary system, and a receiver in the mobile communication system is a secondary user. The primary system mentioned here may refer to those systems having spectrum usage rights, such as television broadcasting systems, while the secondary systems are systems having no spectrum usage rights and appropriately using the spectrum only when the primary system does not use its own spectrum. In addition, the primary and secondary systems may also be systems having spectrum usage rights at the same time but having different priorities in spectrum usage. For example, when an operator deploys a new base station to provide a new service, the existing base station and the service provided have a spectrum usage priority. The primary system can be composed of primary user base stations and primary users, and the secondary system can be composed of secondary user base stations and secondary users. Communication between a secondary user base station and one or more secondary users or between multiple secondary users can constitute a secondary system.

This communication method in which the primary and secondary systems coexist requires that the application of the secondary system does not cause adverse effects on the application of the primary system, or that the effects caused by the spectrum utilization of the secondary system can be controlled within a tolerance of the primary system. When there are multiple secondary systems, aggregate interference of the secondary system should not exceed an interference tolerance of the primary system.

SUMMARY OF THE INVENTION

A brief summary of embodiments of the present invention is given below, to provide a basic understanding of some aspects of the present invention. It should be understood that the following summary is not an exhaustive summary of the present invention; it does not intend to define a key or important part of the present invention, nor does it intend to limit the scope of the present invention. The object of the summary is only to briefly present some concepts, which serves as a preamble of a more detailed description that follows.

According to an embodiment, an electronic device for spectrum management comprises processing circuitry. The processing circuitry is configured to acquire an interference relationship between wireless access nodes managed by a first-level spectrum management device, wherein the wireless access nodes comprise wireless access nodes which are respectively managed by different second-level spectrum management devices. The processing circuitry is further configured to, based on the acquired interference relationship, allocate multiplexed spectrum resources for the wireless access nodes which do not interfere with each other, and allocate orthogonal spectrum resources for the wireless access nodes which interfere with each other.

According to another embodiment, there is provided a spectrum management method, comprising a step of acquiring an interference relationship between wireless access nodes managed by a first-level spectrum management device. The wireless access nodes comprise wireless access nodes which are respectively managed by different second-level spectrum management devices. The method further comprises, based on the acquired interference relationship, allocating multiplexed spectrum resources for the wireless access nodes which do not interfere with each other, and allocating orthogonal spectrum resources for the wireless access nodes which interfere with each other.

According to yet another embodiment, an electronic device for spectrum management comprises processing circuitry. The processing circuitry is configured to, based on spectrum resources allocated by a first-level spectrum management device, allocate respective spectrum resources for wireless access nodes managed by second-level spectrum management devices. The spectrum resources allocated by the first-level spectrum management device are allocated based on an interference relationship between wireless access nodes, wherein multiplexed spectrum resources are allocated for the wireless access nodes which do not interfere with each other, and orthogonal spectrum resources are allocated for the wireless access nodes which interfere with each other.

According to still another embodiment, there is provided a spectrum management method, comprising a step of, based on spectrum resources allocated by a first-level spectrum management device, allocating respective spectrum resources for wireless access nodes managed by second-level spectrum management devices. The spectrum resources allocated by the first-level spectrum management device are allocated based on an interference relationship between wireless access nodes, wherein multiplexed spectrum resources are allocated for the wireless access nodes which do not interfere with each other, and orthogonal spectrum resources are allocated for the wireless access nodes which interfere with each other.

According to another embodiment, an electronic device for a wireless access node comprises processing circuitry. The processing circuitry is configured to perform control to request a spectrum resource from a first-level spectrum management device, and receive information about allocation of spectrum resource from the first-level spectrum management device or from a second-level spectrum management device. The spectrum resource is allocated based on an interference relationship between wireless access nodes, wherein multiplexed spectrum resources are allocated for the wireless access nodes which do not interfere with each other, and orthogonal spectrum resources are allocated for the wireless access nodes which interfere with each other.

According to yet another embodiment, there is provided a control method for a wireless access node, comprising requesting a spectrum resource from a first-level spectrum management device and receiving information about allocation of spectrum resource from the first-level spectrum management device or from a second-level spectrum management device. The spectrum resource is allocated based on an interference relationship between wireless access nodes, wherein multiplexed spectrum resources are allocated for the wireless access nodes which do not interfere with each other, and orthogonal spectrum resources are allocated for the wireless access nodes which interfere with each other.

Embodiments of the present disclosure further include a computer-readable medium including executable instructions that, when executed by an information processing apparatus, cause the information processing apparatus to implement the methods according the embodiments of the present disclosure.

The embodiments of the present disclosure are beneficial to improving spectrum utilization efficiency.

BRIEF DESCRIPTION OF THE DRAWINGS

The present invention can be better understood with reference to the description given below in combination with the appended drawings. Throughout the appended drawings, the same or similar reference signs are used to denote the same or similar components. The appended drawings together with the detailed description below are included in the specification and constitute a part of the specification, to further illustrate preferred embodiments of the present invention and explain the principles and advantages of the present invention. In the appended drawings.

EMBODIMENTS OF THE INVENTION

Figure 1:
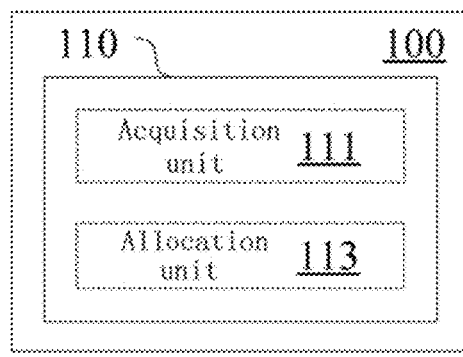
FIG. 1 is a block diagram showing a configuration example of an electronic device for spectrum management according to an embodiment of the present invention.

Hereinafter, embodiments of the present invention will be described below with reference to the drawings. Elements and features described in one figure or one embodiment of the present invention may be combined with elements and features shown in one or more other figures or embodiments. It should be noted that, for the sake of clarity, representations and descriptions of components and processing known to those ordinarily skilled which are irrelevant to the present invention which are in the art are omitted in the drawings and the description.

As shown in FIG. 1, an electronic device 100 for wireless communications according to the present embodiment comrpises processing circuitry 110. The processing circuitry 110 may be implemented as, for example, a specific chip, a chipset, or a central processing unit (CPU) or the like.

The processing circuitry 110 comprises an acquisition unit 111 and an allocation unit 113. It should be noted that although the acquisition unit 111 and the distribution unit 113 are shown in the form of functional blocks in the Drawings, it should be understood that the functions of these units may also be implemented by the processing circuitry 110 as a whole, but not necessarily by discrete, actual components in the circuitry 110. In addition, although the processing circuitry 110 is shown in a frame in the figure, the electronic device 100 may comprise a plurality of processing circuitries, and the functions of the acquisition unit 111 and the distribution unit 113 may be distributed among the plurality of processing circuitries so as to implement these functions through cooperative operations of the plurality of processing circuitries.

The acquisition unit 111 is configured to acquire an interference relationship between wireless access nodes managed by a first-level spectrum management device. The wireless access nodes managed by the first-level spectrum management device comprise wireless access nodes which are respectively managed by different second-level spectrum management devices.

For example, the acquisition unit 111 can obtain the above-mentioned interference relationship by estimating an interference situation between the wireless access nodes based on location information and configuration information and the like of the wireless access nodes managed by the first-level spectrum management device.

For the scenario of dynamic spectrum utilization, the wireless access nodes may operate as a secondary system, and the secondary system has lower use rights of spectrum resources than the primary system.

Figure 14:
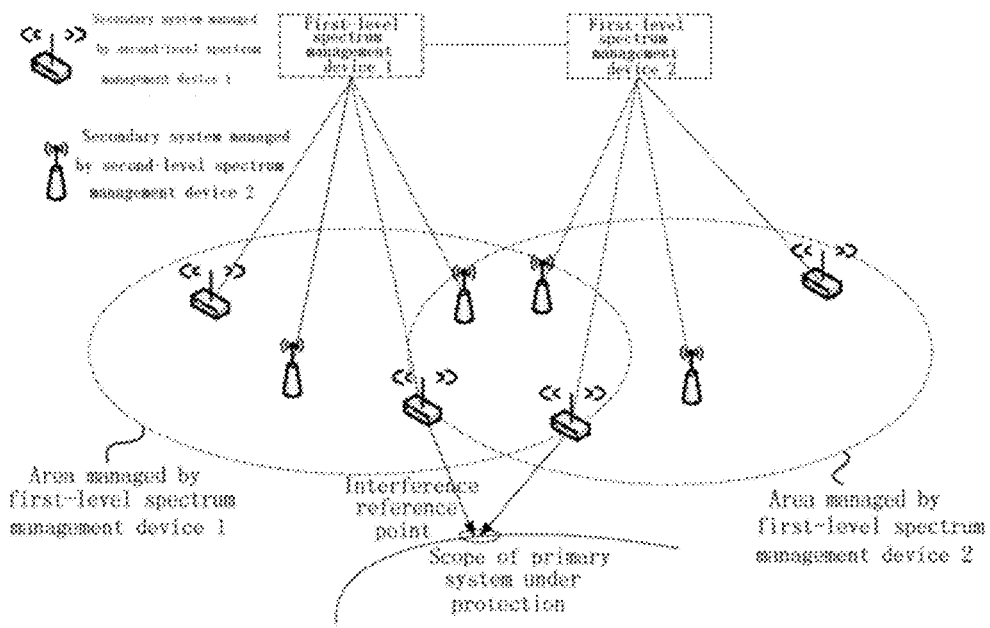
FIG. 14 is a schematic diagram showing respective systems that dynamically use spectrum resources.

In the example scenario shown in FIG. 14, there are multiple areas and each area has a respective first-level spectrum management device. The first-level spectrum management device determines available spectrum resources of the secondary system according to interference of the secondary system to the primary system. For example, the first-level spectrum management device may be a spectrum allocation function module provided by an authorized geographic location database operator. The second-level spectrum management device adjusts the spectrum usage of the secondary system within a range of the available spectrum resources after the secondary system obtains the available spectrum resources. For example, the second-level spectrum management device may be a different operator or network provider or a network management organization in a certain office area, residential area or a university campus. A group of secondary systems managed by the same second-level spectrum management may be referred to as a Coexistence Group (CG). The second-level spectrum management device performs spectrum allocation for the secondary system according to available spectrum resources within the obtained coexistence group.

The first-level spectrum management device in the embodiment of the present invention may correspond to, for example, a Spectrum Access System (SAS), the second-level spectrum management device in the embodiment of the present invention may correspond to, for example, a Coexistence Manager (CxM), and the wireless access node in the embodiment of the present invention may correspond to, for example, a Citizens Broadband Radio Service Device (CBSD).

Figure 24:
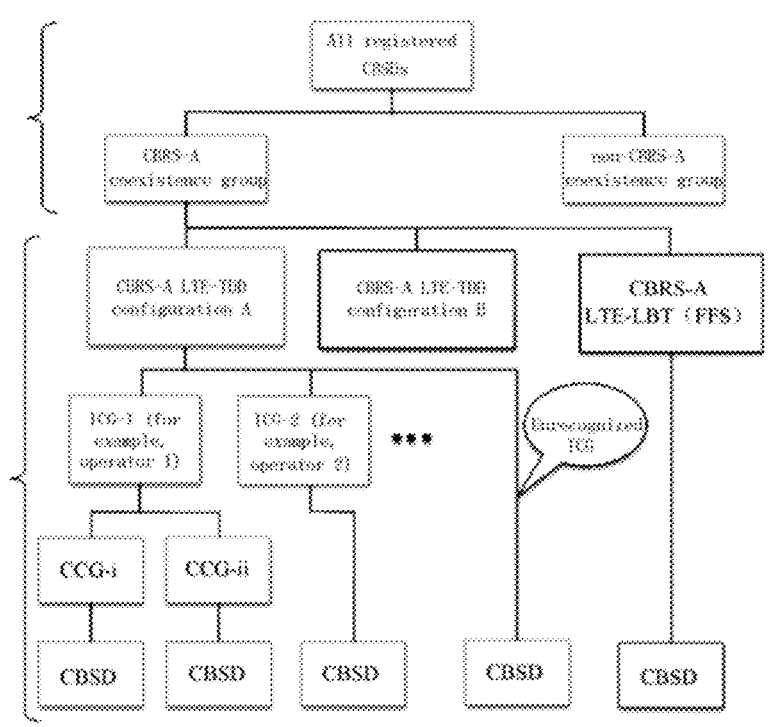
FIG. 24 shows an example of a relational structure of spectrum resource management.

As an example of a relational structure of spectrum resource management, FIG. 24 shows a relationship among Citizens Broadband Radio Services (CBRS) alliance configuration, Interference Coordination Groups (ICG) and Common Channel Groups (CCG).

The first-level spectrum management device is, for example, an SAS. The second-level spectrum management device is, for example, a CxM, and can coordinate spectrum allocation of its subordinate CBSDs. The CBRS-A coexistence group in the figure can be managed by a CxM. CBSDs can also be divided into different ICGs. The mutual interference between CBSDs in the same ICG can be coordinated by the CBSDs themselves, and does not need to be managed by a second-level spectrum management device. CBSDs in an ICG can also belong to the same CCG. CBSDs in the same CCG use the same frequency band. The ICG and the CCG can be represented as a vertex when an interference relationship graph is built.

Next, referring to FIG. 1 continuously, the allocation unit 113 is configured to, based on the interference relationship acquired by the acquisition unit 111, allocate multiplexed spectrum resources for the wireless access nodes which do not interfere with each other, and allocate orthogonal spectrum resources for the wireless access nodes which interfere with each other.

Figure 2:
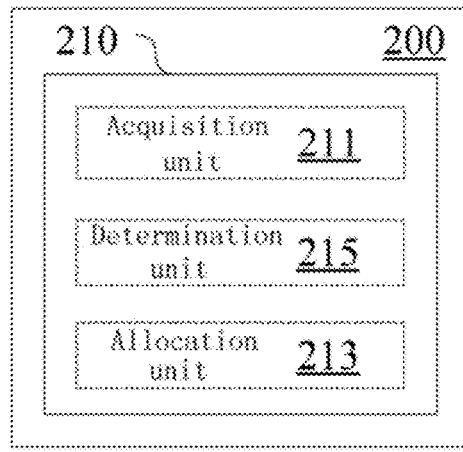
FIG. 2 is a block diagram showing a configuration example of an electronic device for spectrum management according to another embodiment.

In addition, since the coverage of different coexistence groups may overlap, these overlapping coexistence groups constitute a Connected Set, and the first-level spectrum management device or the second-level spectrum management device can determine an interference relationship between all secondary systems in the Connected Set. Accordingly, as shown in FIG. 2, processing circuitry 210 of an electronic device 200 for spectrum management according to an embodiment may further comprise a determination unit 215 in addition to the acquisition unit 211 and the allocation unit 213, and the determination unit 215 is configured to determine an overlapping area managed by different second-level spectrum management devices, and the allocation unit 213 is configured to, with respect to the overlapping area, allocate multiplexed spectrum resources for the wireless access nodes which do not interfere with each other, and allocate orthogonal spectrum resources for the wireless access nodes which interfere with each other, based on the interference relationship acquired by the allocation unit 211.

Figure 15:
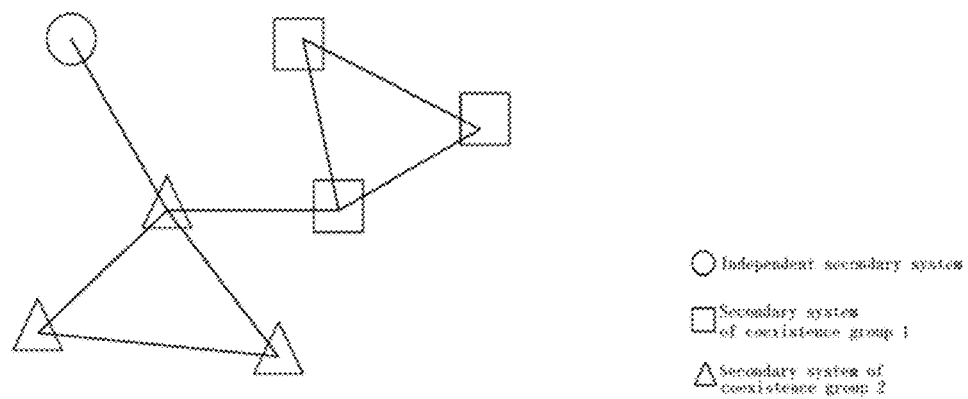
FIG. 15 is an example of an interference relationship graph seen in a secondary system.

FIG. 15 shows an example of a structure graph of an interference relationship. In addition, according to an embodiment, the acquisition unit 111 may be configured to create a structure graph of wireless access nodes based on the interference relationship, and a side of the structure graph represents interference between the wireless access nodes. If there is a side between two vertices in the graph, it is represented that there is mutual interference between secondary systems represented by the two vertices. The vertex in the figure may be a secondary system, and may also be a group of secondary systems that can withstand mutual interference or are willing to use the same frequency band. The allocation unit 113 can perform allocation of spectrum resources based on a chromatic number of the structure graph which is determined with a graph coloring method.

The first-level spectrum management device can allocate available spectrum resources to secondary systems using the graph coloring method. More specifically, the first-level spectrum management device can calculate a minimum chromatic number of a co-existence group graph in a connected set and a chromatic number of secondary systems (also referred to as "independent wireless access nodes" or "independent secondary systems" herein) which do not belong to any co-existence group, and then all spectrum resources can be divided into several orthogonal spectrum resources according to the sum of the chromatic numbers.

Since the second-level spectrum management device of each coexistence group can arbitrarily allocate spectrum resources in the coexistence group, in order to avoid interference from being produced between different coexistence groups and independent secondary systems, the first-level spectrum management device should allocate resources that do not interfere with each other, i.e., orthogonal spectrum resources, for these coexistence groups and independent secondary systems. Two nodes that are not connected with each other can use one color, i.e., one chromatic number, and two nodes that are connected with each other use two colors, i.e., two chromatic numbers. A minimum chromatic number of each of the coexistence group 1 and the coexistence group 2 shown in FIG. 15 is 3, and the independent secondary system can share the spectrum of the coexistence group 1. Therefore, the first-level spectrum management device can divide the spectrum resources into six parts and distribute the six parts to the independent secondary system, the coexistence group 1 and the coexistence group 2. Assuming that the available spectrum resource is 60 MHz, each secondary system obtains a spectrum resource of 10 MHz.

However, if any two coexistence groups that are connected with each other can achieve spectrum management coordination, it is possible to implement spectrum multiplexing between these two coexistence groups.

Accordingly, according to an embodiment, the allocation unit 113 may be configured to, in a case where two second-level spectrum management devices can coordinate usages of spectrums with each other, allocate non-orthogonal spectrum resources for wireless access nodes managed by the two second-level spectrum management devices. The case where two second-level spectrum management devices can coordinate usages of spectrums with each other includes, for example, that the wireless access nodes managed by the two second-level spectrum management devices can change the used spectrum resources (for example, not configured to use fixed spectrum resources).

Further, in a case where the allocation unit 113 performs allocation of spectrum resources based on a chromatic number of the structure graph which is determined with a graph coloring method, the allocation unit 113 can determine the chromatic number by regarding as same co-existence group the wireless access nodes managed by the two second-level spectrum management devices which can perform the coordination.

In addition, as described above, the wireless access nodes may comprise an independent wireless access node which is not managed by any second-level spectrum management device. In this case, the allocation unit 113 can determine the chromatic number by regarding the independent wireless access node as a separate co-existence group.

Next, a manner of resource allocation in a case where there are second-level spectrum management devices which can perform coordination will be described in combination with a specific example.

Figure 16:
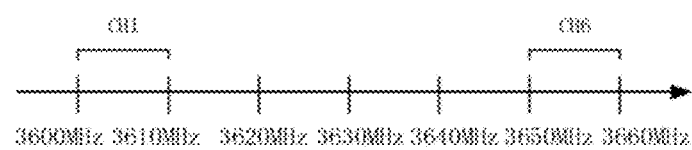
FIGS. 16 and 17 show an example of spectrum resource allocation.
Figure 17:
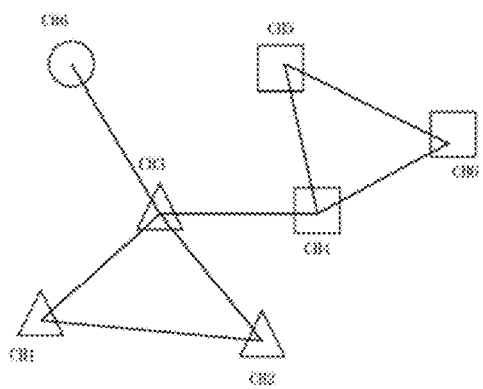

First, for comparison, a case where spectrum coordination cannot be performed between the coexistence group 1 and the coexistence group 2 in the structure shown in FIG. 15 is assumed. In this case, a minimum chromatic number of a graph of each of the coexistence group 1 and the coexistence group 2 is 3. Although the independent secondary system is connected with the coexistence group 2 and thus orthogonal spectrum will be used, the independent secondary system is not connected with the coexistence group 1 and thus may use the same frequency band. Therefore, as shown in FIG. 16, the entire spectrum resource such as 60 MHz is allocated into 6 parts such as channels CH1 to CH6, and each channel is 10 MHz. As shown in FIG. 17, the coexistence group 2 can arbitrarily use channels CH1 to CH3. The coexistence group 1 can use channels CH4 to CH6. The independent secondary system can use any one of the channels CH4 to CH6.

On the other hand, in the case where there are second-level spectrum management devices which can perform coordination, the chromatic number can be determined by regarding as a same co-existence group the wireless access nodes managed by the two second-level spectrum management devices, thereby making it possible to allocate more resources to each wireless access node.

Figure 18:
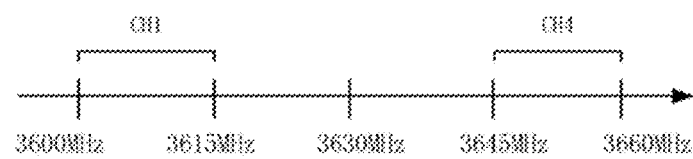
FIGS. 18 and 19 show another example of spectrum resource allocation.
Figure 19:
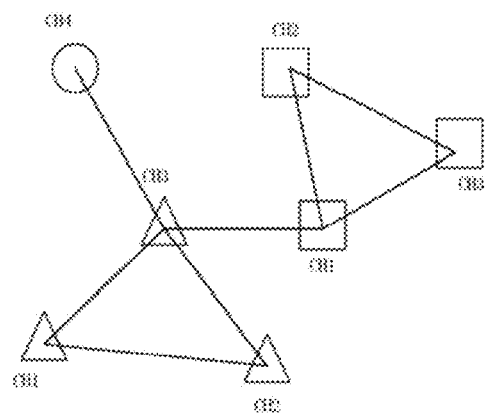

An example embodiment will be further described below with reference to FIGS. 18 and 19.

If the first-level spectrum management device obtains information from the second-level spectrum management devices and confirms that the coexistence group 1 and the coexistence group 2 can perform coordination, the first-level spectrum management device can consider the two coexistence groups as a virtual coexistence group. For the example structure shown in FIG. 15, in a case where the coexistence group 1 and the coexistence group 2 are taken as a virtual coexistence group, it can be determined that a minimum chromatic number of the coexistence group is 3. In addition, the independent secondary system cannot perform coordination with the coexistence group and has a chromatic number of 1. Therefore, as shown in FIG. 18, the entire spectrum resource is divided into four parts, which are defined as channels CH1 to CH4, and each channel becomes 15 MHz. It can be seen that since the coexistence groups can perform coordination, spectrum multiplexing efficiency increases. FIG. 19 shows a specific channel allocation result.

As can be seen from the above example, since the coexistence group 1 and the coexistence group 2 can achieve spectrum management coordination through negotiation, the efficiency of spectrum multiplexing is increased, thus obtaining larger spectrum resources. However, the independent secondary system does not participate in spectrum coexistence coordination, and the independent secondary system needs independent allocation of spectrum resources. Accordingly, according to an example embodiment, spectrum adjustment can be performed only between coexistence groups which perform coordination.

Figure 20:
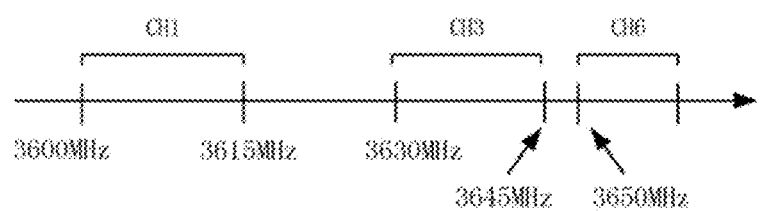
FIGS. 20 and 21 show another example of spectrum resource allocation.
Figure 21:
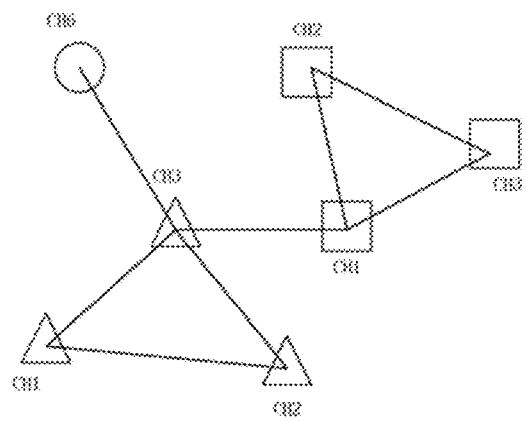

Another example embodiment will be further described below with reference to FIGS. 20 and 21.

As in the example described above with reference to FIG. 16 and FIG. 17, if the first-level spectrum management device allocates channel CH6 (i.e., the CH6 shown in FIG. 17) with a spectrum resource 10 MHz for the independent secondary system before the coexistence group 1 and the coexistence group 2 reach coordination, frequency bands of the coexistence group 2 are CH1, CH2 and CH3, and frequency bands of the coexistence group 1 are CH4, CH5 and CH6, then when it is confirmed that the coexistence group 1 and the coexistence group 2 can perform spectrum coordination, CH1 to CH5 can be integrated into a total of 50 MHz spectrum resources from 3600 MHz to 3650 MHz and then are allocated to the coexistence group 1 and the coexistence group 2, so that the coexistence group 1 and the coexistence group 2 can obtain more spectrum resources together after reaching coordination. For example, the total of 50 MHz spectrum resources from 3600 MHz to 3650 MHz may be re-divided into three channels CH1 to CH3, and although not specifically shown in FIG. 20, one or more channels of CH1 to CH3 may be greater than 15 MHz.

It should be noted that the above example is only illustrative but not restrictive.

The electronic device according to the above-mentioned embodiment can be implemented, for example, at first-level spectrum management device side. When the first-level spectrum management device allocates available spectrum resources for secondary system coexistence groups that are connected with each other, it may consider whether second-level spectrum management devices of these coexistence groups may support the coordination. If the coordination is supported, consecutive spectrum resources can be divided into adjacent coexistence groups.

Figure 3:
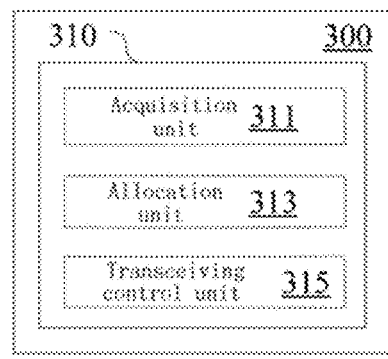
FIG. 3 is a block diagram showing a configuration example of an electronic device for spectrum management according to yet another embodiment.

Accordingly, as shown in FIG. 3, according to an embodiment, processing circuitry 310 of an electronic device 300 for spectrum management may further comprise a transceiving control unit 315 in addition to the acquisition unit 311 and the allocation unit 313.

The transceiving control unit 315 is configured to perform control to receive, from the second-level spectrum management devices, information indicating whether the spectrum resource coordination can be performed.

More specifically, whether the coordination is supported can be represented by a pair of the second-level spectrum management devices IDs and 1, 0.

The allocation unit 313 may be configured to allocate consecutive spectrum resources for the wireless access nodes managed by the two second-level spectrum management devices which can perform the coordination.

In addition, the allocation unit 313 may be configured to adjust an allocation manner of the spectrum resources, when a coordination state of the second-level spectrum management devices changes from being coordinatable to un-coordinatable.

For example, if a coordination state of two second-level spectrum management devices that are connected with each other changes from being coordinatable to un-coordinatable, then the first-level spectrum management device may adjust an allocation manner from the example manner described with reference to FIGS. 18 and 19 (or the example manner described with reference to FIG. 20 and FIG. 21) back to the example manner described with reference to FIGS. 16 and 17.

At second-level spectrum management device side, after available spectrum resources are obtained, the resources can be allocated and optimized. In addition, any second-level spectrum management device can perform information interaction with adjacent second-level spectrum management devices, so as to confirm whether the allocated spectrum resources conflict with spectrum resource allocation of a secondary system managed by another spectrum management device. The different second-level spectrum management devices mentioned here refer to such second-level spectrum management devices that there is mutual interference between secondary systems managed by them, or in other words, vertices with existence of a connection line between them in an interference graph can be considered as adjacent second-level spectrum management devices. In addition, the second-level spectrum management devices notify whether the first-level spectrum management device can perform the coordination.

The second-level spectrum management devices can determine the coordination state in a variety of manners.

On the one hand, the coordination state can be determined periodically. For example, after performing information interaction with the first-level spectrum management device every day, the second-level spectrum management device may update the coordination state according to acquired secondary system information. Whether the coordination can be achieved not only depends on whether the second-level spectrum management devices support information interaction with each other, but also on whether their respective decisions made for performing spectrum allocation for the secondary systems can reach an agreement. Therefore, different states of the secondary systems (including resource requirements) may lead to different coordination states.

In addition, the determination of the coordination status can also be triggered based on the spectrum usage requirements of the secondary system. In particular, if mutual coordination is not supported between the second-level spectrum management devices, it is necessary to allocate orthogonal resources for them.

Figure 22:
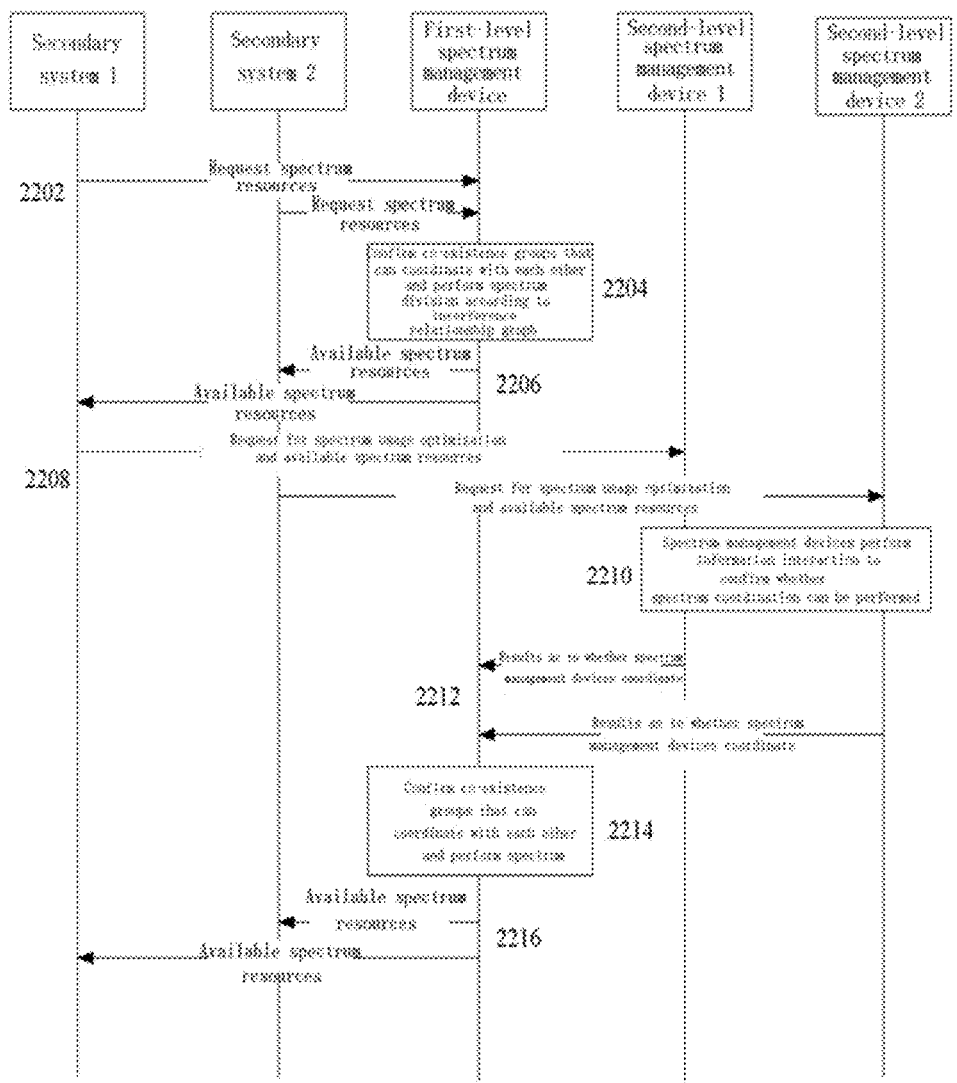
FIGS. 22 and 23 show an example process of information interaction for spectrum resource allocation.
Figure 23:
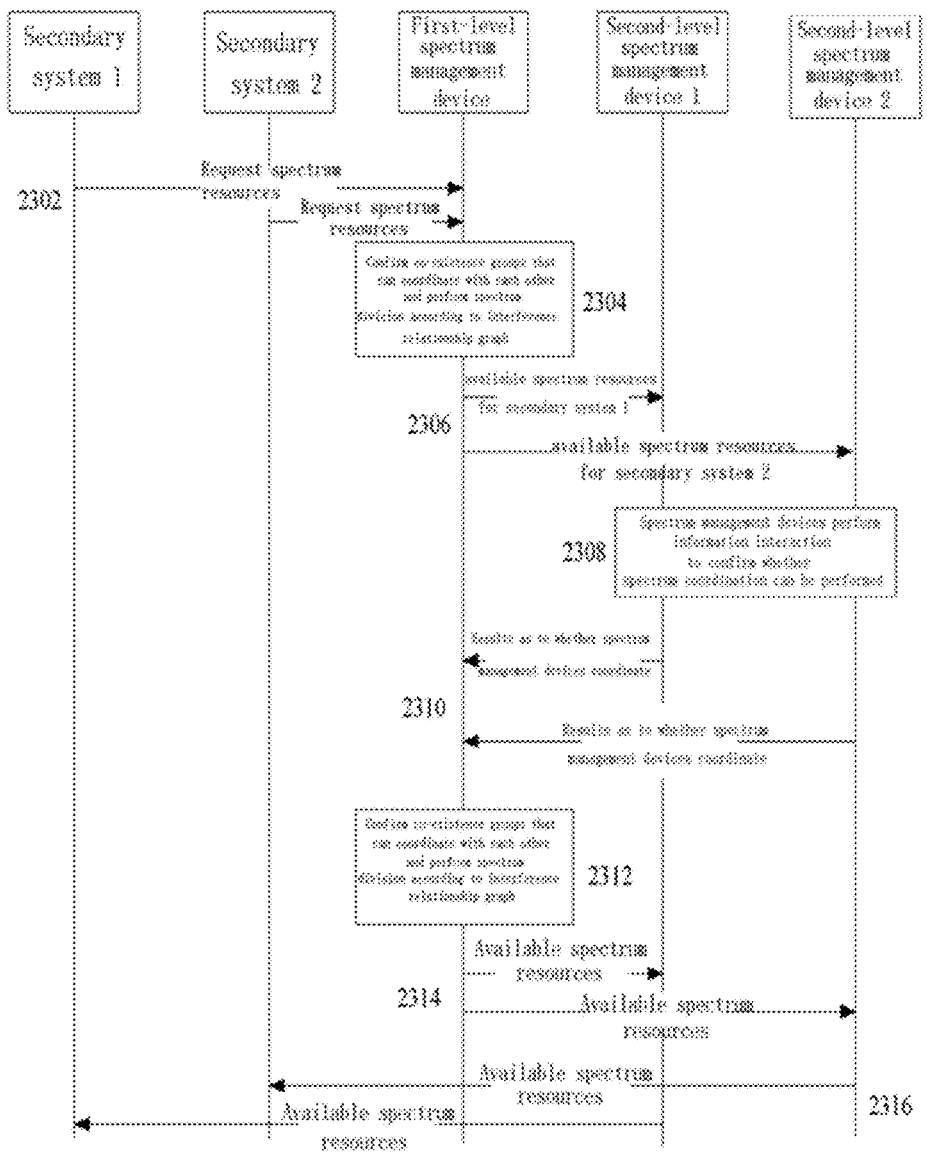

By way of example and not limitation, FIGS. 22 and 23 show an example process of information interaction for allocating spectrum resource.

In the example shown in FIG. 22, at 2202, the secondary system requests spectrum resources from the first-level spectrum management device; at 2204, the first-level spectrum management device performs spectrum division; at 2206, the first-level spectrum management device notifies the secondary system of available spectrum resources; at 2208, the secondary system requests optimization of spectrum usage from the respective second-level spectrum management devices; at 2210, the second-level spectrum management devices confirm with each other whether spectrum coordination can be performed; at 2212, the second-level spectrum management devices notify the first-level spectrum management device of results of whether coordination is possible; at 2214, the first-level spectrum management device performs spectrum division according to a coordination situation; at 2216, the first-level spectrum management device notifies adjusted spectrum resources to the secondary system.

In the example shown in FIG. 23, at 2202, the secondary system requests spectrum resources from the first-level spectrum management device; at 2304, the first-level spectrum management device performs spectrum division; at 2306, the first-level spectrum management device notifies the second-level spectrum management devices of available spectrum resources; at 2308, the second-level spectrum management devices confirm with each other whether spectrum coordination can be performed; at 2310, the second-level spectrum management devices notify the first-level spectrum management device of results as to whether coordination is possible; at 2312, the first-level spectrum management device performs spectrum division according to a coordination situation; at 2314, the first-level spectrum management device notifies adjusted spectrum resources to the second-level spectrum management devices; at 2316, the second-level spectrum management devices allocate spectrum resources for the secondary system.

In the foregoing description of the devices according to the embodiments of the present invention, it is clear that some methods and procedure have also been disclosed. Next, a description of a spectrum management method according to an embodiment of the present invention will be given without repeating the details which have been described previously.

Figure 4:
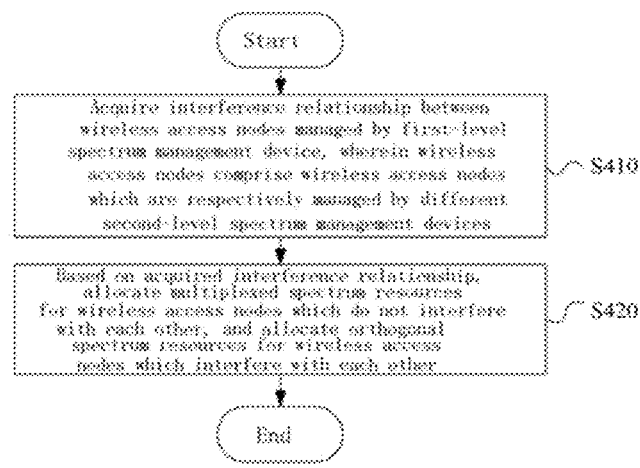
FIG. 4 is a flowchart showing a process example of a spectrum management method according to an embodiment of the present invention.

As shown in FIG. 4, the spectrum management method according to the present embodiment comprises steps S410 and S420.

In S410, an interference relationship between wireless access nodes managed by a first-level spectrum management device is acquired, wherein the wireless access nodes comprise wireless access nodes which are respectively managed by different second-level spectrum management devices.

In step S420, based on the acquired interference relationship, multiplexed spectrum resources are allocated for the wireless access nodes which do not interfere with each other and orthogonal spectrum resources are allocated for the wireless access nodes which interfere with each other.

In addition, in a case where two second-level spectrum management devices can coordinate usages of spectrums with each other, non-orthogonal spectrum resources are allocated for wireless access nodes managed by the two second-level spectrum management devices in S420.

In addition, the spectrum management method according to an embodiment further comprises: creating a structure graph of wireless access nodes based on the interference relationship, wherein a side of the structure graph represents interference between the wireless access nodes. Allocation of spectrum resources can be based on a chromatic number of the structure graph which is determined by a graph coloring method.

More specifically, the chromatic number can be determined by regarding as a same co-existence group the wireless access nodes managed by the two second-level spectrum management devices which can perform the coordination.

In addition, the wireless access nodes may further comprise an independent wireless access node which is not managed by any second-level spectrum management device, and the chromatic number can be determined by regarding the independent wireless access node as a separate co-existence group.

Figure 5:
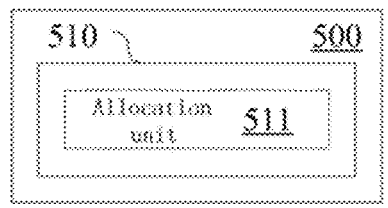
FIG. 5 is a block diagram showing a configuration example of an electronic device for spectrum management according to an embodiment of the present invention.

Embodiments of the present invention may further include, for example, an electronic device implemented at second-level spectrum management device side. As shown in FIG. 5, an electronic device 500 for spectrum management according to an embodiment comprises processing circuitry 510, and the processing circuitry 510 comprises an allocation unit 511 configured to, based on spectrum resources allocated by a first-level spectrum management device, allocate respective spectrum resources for wireless access nodes managed by second-level spectrum management devices. The spectrum resources allocated by the first-level spectrum management device are allocated based on an interference relationship between wireless access nodes, wherein multiplexed spectrum resources are allocated for the wireless access nodes which do not interfere with each other, and orthogonal spectrum resources are allocated for the wireless access nodes which interfere with each other.

Figure 6:
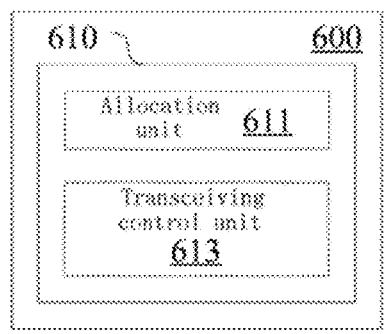
FIG. 6 is a block diagram showing a configuration example of an electronic device for spectrum management according to another embodiment.

In a case where two second-level spectrum management devices can coordinate usages of spectrums with each other, the first-level spectrum management device can allocate non-orthogonal spectrum resources for wireless access nodes managed by the two second-level spectrum management devices. The first-level spectrum management device can, for example, calculate a minimum chromatic number of a co-existence group graph in a connected set, and a chromatic number of wireless access nodes which do not belong to a co-existence group In addition, as shown in FIG. 6, processing circuitry 610 of an electronic device 600 for spectrum management according to an embodiment further comprises a transceiving control unit (transmitting/receiving control unit) 613 in addition to the distribution unit 611, and the transceiving control unit 613 is configured to perform control to send, to the first-level spectrum management device, information indicating that a current second-level spectrum management device can perform the coordination with another second-level spectrum management device.

Figure 7:
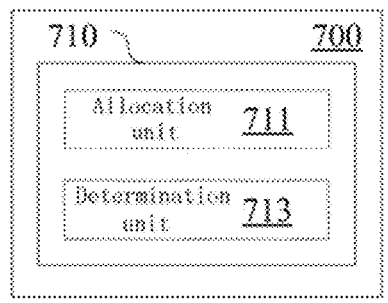
FIG. 7 is a block diagram showing a configuration example of an electronic device for spectrum management according to yet another embodiment.

In addition, as shown in FIG. 7, processing circuitry 710 of an electronic device 700 for spectrum management according to an embodiment further comprises a determination unit 713 in addition to the allocation unit 711.

The determination unit 713 is configured to determine, according to performance requirements, whether it is necessary to perform the coordination with another second-level spectrum management device, after a current second-level spectrum management device acquires available spectrum resources from the first-level spectrum management device.

In a case where the second-level spectrum management devices coordinate resource usages, for example, one second-level spectrum management apparatus may serve as a master device, and the other second-level spectrum management apparatus may serve as a slave device.

The second-level spectrum management device as the master device can, in a case where the first-level spectrum management device allocates available spectrum resources by regarding wireless access nodes managed by a current second-level spectrum management device and another second-level spectrum management device as a same co-existence group, allocate respective spectrum resources for wireless access nodes in the same co-existence group.

The second-level spectrum management device as the slave device can, in a case where the first-level spectrum management device allocates available spectrum resources by regarding as same co-existence group wireless access nodes managed by a current second-level spectrum management device and another second-level spectrum management device, receive, from the another second-level spectrum management device, information about allocation of respective spectrum resources for wireless access nodes in the same co-existence group.

The manner in which the second-level spectrum management devices coordinate resource usages is not limited to the manner described above. For example, two second-level spectrum management devices may also coordinate usage of resource through a negotiation process.

Figure 8:
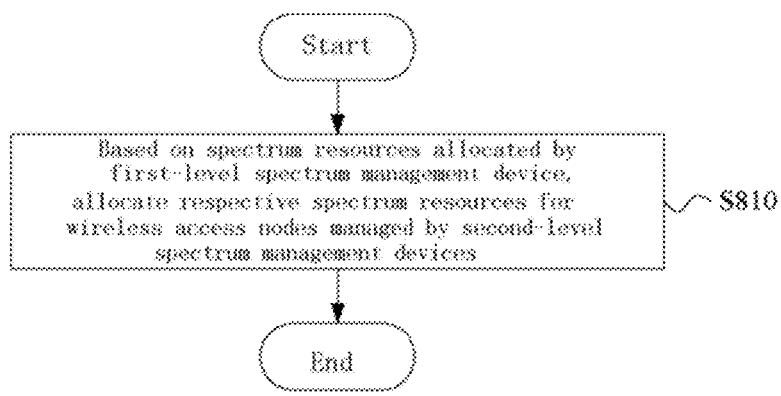
FIG. 8 is a flowchart showing a process example of a spectrum management method according to an embodiment of the present invention.

FIG. 8 shows a spectrum management method corresponding to the second-level spectrum management device side, which comprises S810 of, based on spectrum resources allocated by a first-level spectrum management device, allocating respective spectrum resources for wireless access nodes managed by second-level spectrum management devices. The spectrum resources allocated by the first-level spectrum management device are allocated based on an interference relationship between wireless access nodes, wherein multiplexed spectrum resources are allocated for the wireless access nodes which do not interfere with each other, and orthogonal spectrum resources are allocated for the wireless access nodes which interfere with each other. In addition, in a case where two second-level spectrum management devices can coordinate usages of spectrums with each other, the first-level spectrum management device allocates non-orthogonal spectrum resources for wireless access nodes managed by the two second-level spectrum management devices.

Figure 9:
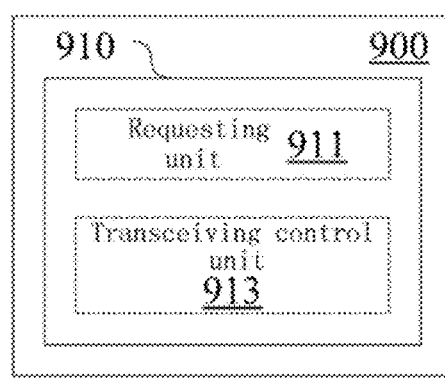
FIG. 9 is a block diagram showing a configuration example of an electronic device for a wireless access node according to an embodiment of the present invention.

In addition, embodiments of the present invention further include an electronic device at wireless access node (secondary system) side. As shown in FIG. 9, an electronic device 900 for a wireless access node comprises processing circuitry 910, and the processing circuitry 910 comprises a requesting unit 911 and a transceiving control unit 913.

The requesting unit 911 is configured to perform control to request a spectrum resource from a first-level spectrum management device.

The transceiving control unit 913 is configured to perform control to receive information about allocation of spectrum resource from the first-level spectrum management device or from a second-level spectrum management device. The spectrum resource is allocated based on an interference relationship between wireless access nodes, wherein multiplexed spectrum resources are allocated for the wireless access nodes which do not interfere with each other, and orthogonal spectrum resources are allocated for the wireless access nodes which interfere with each other. In a case where two second-level spectrum management devices can coordinate usages of spectrums with each other, the first-level spectrum management device allocates non-orthogonal spectrum resources for wireless access nodes managed by the two second-level spectrum management devices.

Figure 10:
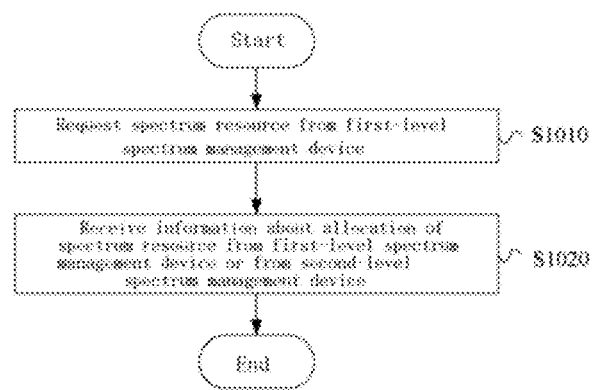
FIG. 10 is a flowchart showing a process example of a control method for a wireless access node according to an embodiment of the present invention.

FIG. 10 shows a control method for a wireless access node according to an embodiment, which comprises S1010 and S1020.

In S1010, a spectrum resource is requested from a first-level spectrum management device.

In S1020, information about allocation of spectrum resource is received from the first-level spectrum management device or from a second-level spectrum management device. The spectrum resource is allocated based on an interference relationship between wireless access nodes, wherein multiplexed spectrum resources are allocated for the wireless access nodes which do not interfere with each other, and orthogonal spectrum resources are allocated for the wireless access nodes which interfere with each other. In addition, in a case where two second-level spectrum management devices can coordinate usages of spectrums with each other, the first-level spectrum management device allocates non-orthogonal spectrum resources for wireless access nodes managed by the two second-level spectrum management devices.

In addition, embodiments of the present disclosure further include a computer-readable medium comprising executable instructions that, when executed by an information processing apparatus, cause the information processing apparatus to implement the wireless communication method according to the embodiment of the present disclosure.

As an example, each step of the above method and each constituent module and/or unit of the above device may be implemented as software, firmware, hardware, or a combination thereof. In case of implementation by software or firmware, a computer (for example, a general-purpose computer 1100 shown in FIG. 11) with a dedicated hardware structure may be installed with a program constituting software for implementing the above method from a storage medium or a network. The computer, when installed with various programs, can implement various functions and the like.

Figure 11:
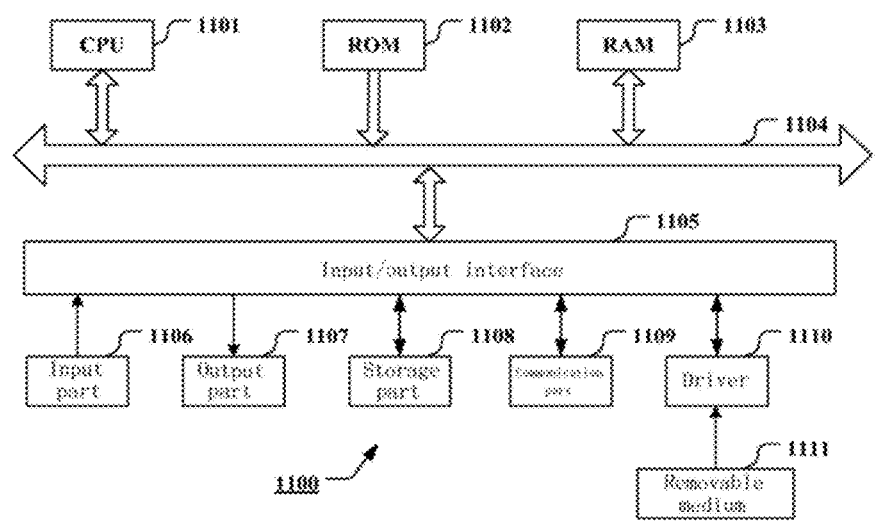
FIG. 11 is a block diagram showing an exemplary structure of a computer that implements the methods and devices of the present disclosure.

In FIG. 11, an arithmetic processing unit (i.e., the CPU) 1101 performs various processing according to a program stored in a read-only memory (ROM) 1102 or a program loaded from a storage part 1108 to a random access memory (RAM) 1103. In the RAM 1103, data required when the CPU 1101 performs various processing and the like is also stored as needed. The CPU 1101, the ROM 1102, and the RAM 1103 are linked to each other via a bus 1104. An input/output interface 1105 is also linked to the bus 1104.

The following components are linked to the input/output interface 1105: an input part 1106 (including a keyboard, a mouse, etc.), an output part 1107 (including a display such as a cathode ray tube (CRT), a liquid crystal display (LCD) and the like, as well as a speaker, etc.), a storage part 1108 (including a hard disk, etc.), and a communication part 1109 (including a network interface card such as an LAN card, a modem, etc.). The communication part 1109 performs communication processing via a network such as the Internet. A driver 1110 can also be linked to the input/output interface 1105 as needed. A removable medium 1111 such as a magnetic disk, an optical disk, a magneto-optical disk, a semiconductor memory and the like is installed on the drive 1110 as needed, so that a computer program read out therefrom is installed into the storage part 1108 as needed.

In a case where the above-mentioned series of processing is realized by software, a program constituting the software is installed from a network such as the Internet or a storage medium such as a removable medium 1111.

Those skilled in the art should understand that such a storage medium is not limited to the removable medium 1111 shown in FIG. 11 in which the program is stored and distributed separately from the apparatus to provide the program to the user. Examples of the removable medium 1111 include a magnetic disk (including a floppy disk (registered trademark)), a compact disk (including a compact disk read-only memory (CD-ROM) and digital versatile disk (DVD), a magneto-optical disk (including a mini disk (MD) (registered trademark)), and a semiconductor memory. Alternatively, the storage medium may be the ROM 1102 and a hard disk and the like included in the storage part 1108, in which programs are stored, and are distributed to users along with the apparatus containing them.

Embodiments of the present invention also relates to a program product having stored thereon a machine-readable instruction code that, when read and executed by a machine, can implement the above-mentioned methods according to the embodiments of the present invention.

Accordingly, a storage medium for carrying the above-mentioned program product having stored thereon a machine-readable instruction code is also included in the disclosure of the present invention. The storage medium includes, but is not limited to, a floppy disk, a compact disk, a magneto-optical disk, a memory card, a memory stick, and the like.

Embodiments of the present application also relate to the following electronic devices. In the case where the electronic device is used at base station side, the electronic device can be implemented as any type of evolved Node B (eNB), such as a macro eNB and a small eNB. A small eNB may be an eNB covering a cell smaller than a macro cell, such as a pico eNB, a micro eNB, and a home (femto) eNB. Instead, the electronic device may be implemented as any other type of base station, such as a NodeB and a base transceiver station (BTS). The electronic device may include: a main body (also referred to as base station equipment) configured to control wireless communication; and one or more remote radio headends (RRHs) disposed at a place different from the main body. In addition, all the various types of terminals described below can work as base stations by temporarily or semi-persistently performing base station functions.

In a case where the electronic device is used at user equipment side, it can be realized as a mobile terminal (such as a smartphone, a tablet personal computer (PC), a notebook PC, a portable game terminal, a portable/dongle-type mobile router, and a digital camera) or an in-vehicle terminal (such as car navigation equipment). In addition, the electronic device may be a wireless communication module (such as an integrated circuit module including a single chip or multiple chips) mounted on each of the terminals described above.

[Application Example about Terminal Equipment]

Figure 12:
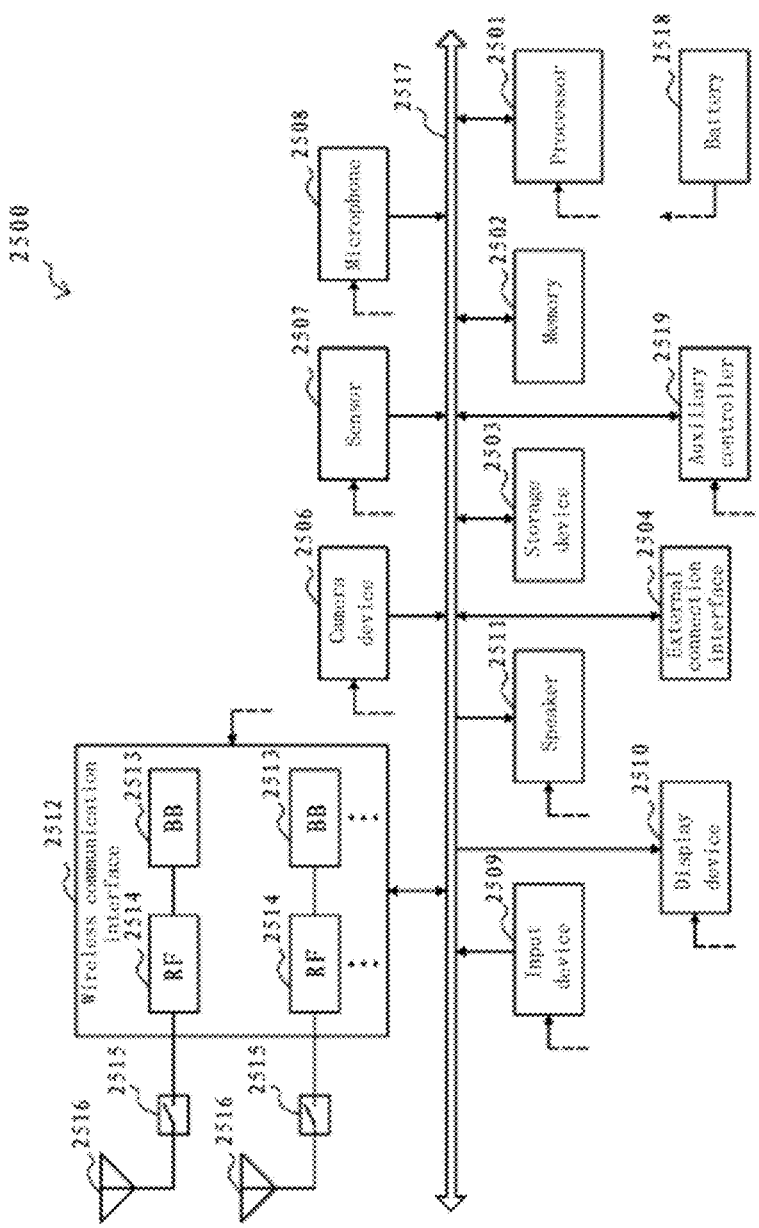
FIG. 12 is a block diagram showing an example of a schematic configuration of a smartphone to which the technology of the present disclosure can be applied.

FIG. 12 is a block diagram showing an example of a schematic configuration of a smartphone 2500 to which the technology of the present disclosure can be applied. The smartphone 2500 includes a processor 2501, a memory 2502, a storage device 2503, an external connection interface 2504, a camera device 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be, for example, a CPU or a system on chip (SoC), and controls functions of an application layer and another layer of the smartphone 2500. The memory 2502 includes a RAM and a ROM, and stores data and programs executed by the processor 2501. The storage device 2503 may include a storage medium, such as a semiconductor memory and a hard disk. The external connection interface 2504 is an interface for connecting external devices (such as a memory card and a universal serial bus (USB) device) to the smartphone 2500.

The camera device 2506 includes an image sensor (such as a charge-coupled device (CCD) and a complementary metal oxide semiconductor (CMOS)), and generates a captured image. The sensor 2507 may include a set of sensors, such as a measurement sensor, a gyroscope sensor, a geomagnetic sensor, and an acceleration sensor. The microphone 2508 converts sound input to the smartphone 2500 into an audio signal. The input device 2509 includes, for example, a touch sensor, a keypad, a keyboard, a button, or a switch configured to detect a touch on a screen of the display device 2510, and receives an operation or information input from a user. The display device 2510 includes a screen (such as a liquid crystal display (LCD) and an organic light emitting diode (OLED) display), and displays an output image of the smartphone 2500. The speaker 2511 converts an audio signal output from the smartphone 2500 into sound.

The wireless communication interface 2512 supports any cellular communication scheme (such as LTE and LTE-Advanced), and performs wireless communication. The wireless communication interface 2512 may generally include, for example, a baseband (BB) processor 2513 and a radio frequency (RF) circuit 2514. The BB processor 2513 can perform, for example, encoding/decoding, modulation/demodulation, and multiplexing/demultiplexing, and perform various types of signal processing for wireless communication. Meanwhile, the RF circuit 2514 may include, for example, a mixer, a filter and an amplifier, and transmits and receives a wireless signal via the antenna 2516. The wireless communication interface 2512 may be a chip module on which a BB processor 2513 and an RF circuit 2514 are integrated. As shown in FIG. 12, the wireless communication interface 2512 may include multiple BB processors 2513 and multiple RF circuits 2514. Although FIG. 12 shows an example in which the wireless communication interface 2512 includes multiple BB processors 2513 and multiple RF circuits 2514, the wireless communication interface 2512 may also include a single BB processor 2513 or a single RF circuit 2514.

In addition, in addition to the cellular communication scheme, the wireless communication interface 2512 may support another type of wireless communication scheme, such as a short-range wireless communication scheme, a near field communication scheme, and a wireless local area network (LAN) scheme. In this case, the wireless communication interface 2512 may include a BB processor 2513 and an RF circuit 2514 for each wireless communication scheme.

Each of the antenna switches 2515 switches a connection destination of the antenna 2516 between a plurality of circuits included in the wireless communication interface 2512 (for example, circuits for different wireless communication schemes).

Each of the antennas 2516 includes a single antenna element or multiple antenna elements (such as multiple antenna elements included in a MIMO antenna), and is used for the wireless communication interface 2512 to transmit and receive wireless signals. As shown in FIG. 12, the smartphone 2500 may include multiple antennas 2516. Although FIG. 12 illustrates an example in which the smartphone 2500 includes multiple antennas 2516, the smartphone 2500 may also include a single antenna 2516.

In addition, the smartphone 2500 may include an antenna 2516 for each wireless communication scheme. In this case, the antenna switch 2515 may be omitted from the configuration of the smartphone 2500.

The bus 2517 connects the processor 2501, the memory 2502, the storage device 2503, the external connection interface 2504, the camera device 2506, the sensor 2507, the microphone 2508, the input device 2509, the display device 2510, the speaker 2511, the wireless communication interface 2512, and the auxiliary controller 2519 to each other. The battery 2518 supplies electric power to each block of the smartphone 2500 shown in FIG. 12 via a feeder, and the feeder is partially shown as a dotted line in the figure. The auxiliary controller 2519 operates the minimum necessary functions of the smartphone 2500 in a sleep mode, for example.

In the smartphone 2500 shown in FIG. 12, the transceiving device (transmitting/receiving device) of the apparatus at user equipment side may be implemented by the wireless communication interface 2512. At least a part of the functions of the electronic device or the processing circuitry of the information processing apparatus and/or each unit at user equipment side may also be implemented by the processor 2501 or the auxiliary controller 2519. For example, electric power consumption of the battery 2518 may be reduced by implementing a part of the functions of the processor 2501 by the auxiliary controller 2519. In addition, the processor 2501 or the auxiliary controller 2519 may implement at least a part of the functions of the electronic device or the processing circuitry and/or each unit of the information processing apparatus at user equipment side by executing a program stored in the memory 2502 or the storage device 2503.

[Application Example about Base Station]

Figure 13:
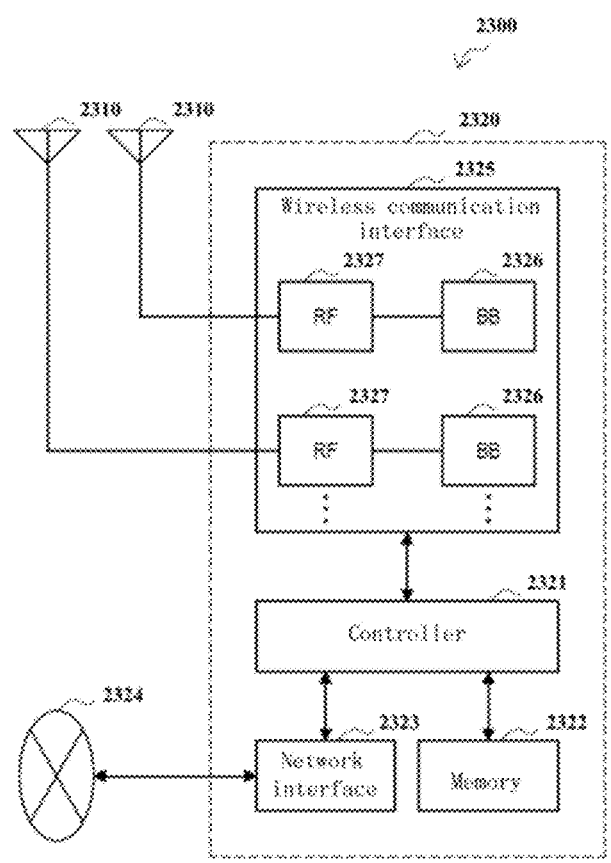
FIG. 13 is a block diagram showing an example of a schematic configuration of a gNB (a base station in a 5G system) to which the technology of the present disclosure can be applied.

FIG. 13 is a block diagram showing an example of a schematic configuration of a gNB to which the technology of the present disclosure can be applied. The gNB 2300 includes multiple antennas 2310 and a base station device 2320. The base station device 2320 and each antenna 2310 may be connected to each other via a radio frequency (RF) cable.

Each of the antennas 2310 includes a single antenna element or multiple antenna elements (such as multiple antenna elements included in a multiple-input multiple-output (MIMO) antenna), and is used for the base station device 2320 to transmit and receive wireless signals. As shown in FIG. 13, the gNB 2300 may include multiple antennas 2310. For example, multiple antennas 2310 may be compatible with multiple frequency bands used by the gNB 2300.

The base station device 2320 includes a controller 2321, a memory 2322, a network interface 2323, and a wireless communication interface 2325.

The controller 2321 may be, for example, a CPU or a DSP, and operates various functions of a higher layer of the base station device 2320. For example, the controller 2321 generates a data packet based on data in a signal processed by the wireless communication interface 2325, and transmits the generated packet via the network interface 2323. The controller 2321 may bundle data from multiple baseband processors to generate a bundled packet, and transmit the generated bundled packet. The controller 2321 may have a logical function that performs control such as radio resource control, radio bearer control, mobility management, admission control and scheduling. This control can be performed in conjunction with nearby gNB or core network nodes. The memory 2322 includes a RAM and a ROM, and stores a program executed by the controller 2321 and various types of control data (such as a terminal list, transmission power data and scheduling data).

The network interface 2323 is a communication interface for connecting the base station device 2320 to a core network 2324. The controller 2321 may communicate with a core network node or another gNB via the network interface 2323. In this case, the gNB 2300 and the core network node or other gNBs may be connected to each other through a logical interface (such as an S1 interface and an X2 interface). The network interface 2323 may also be a wired communication interface, or a wireless communication interface for a wireless backhaul line. If the network interface 2323 is a wireless communication interface, compared to the frequency band used by the wireless communication interface 2325, the network interface 2323 can use a higher frequency band for wireless communication.

The wireless communication interface 2325 supports any cellular communication scheme (such as Long Term Evolution (LTE) and LTE-Advanced), and provides a wireless connection to a terminal located in a cell of the gNB 2300 via the antenna 2310. The wireless communication interface 2325 may generally include, for example, a BB processor 2326 and an RF circuit 2327. The BB processor 2326 can perform, for example, encoding/decoding, modulation/demodulation, and multiplexing/demultiplexing, and perform various types of signal processing of layers (such as L1, Medium Access Control (MAC), Radio Link Control (RLC), and packet data convergence protocols (PDCP)). Instead of the controller 2321, the BB processor 2326 may have a part or all of the above-mentioned logic functions. The BB processor 2326 may be a memory storing a communication control program, or a module including a processor and related circuits configured to execute the program. Updating the program can change the functions of the BB processor 2326. The module may be a card or a blade inserted into a slot of the base station device 2320. Alternatively, the module may be a chip mounted on a card or a blade. Meanwhile, the RF circuit 2327 may include, for example, a mixer, a filter, and an amplifier, and transmits and receives wireless signals via the antenna 2310.

As shown in FIG. 13, the wireless communication interface 2325 may include multiple BB processors 2326. For example, multiple BB processors 2326 may be compatible with multiple frequency bands used by the gNB 2300. As shown in FIG. 13, the wireless communication interface 2325 may include multiple RF circuits 2327. For example, multiple RF circuits 2327 may be compatible with multiple antenna elements. Although FIG. 13 shows an example in which the wireless communication interface 2325 includes multiple BB processors 2326 and multiple RF circuits 2327, the wireless communication interface 2325 may also include a single BB processor 2326 or a single RF circuit 2327.

In the gNB 2300 shown in FIG. 13, the transceiving device (transmitting/receiving device) of the wireless communication device at base station side may be implemented by the wireless communication interface 2325. At least a part of the functions of the electronic device or the processing circuitry and/or each unit of the wireless communication device at base station side may be implemented by the controller 2321. For example, the controller 2321 may execute at least a part of the functions of the electronic device or the processing circuitry and/or each unit of the wireless communication device at base station side by executing a program stored in the memory 2322.

In the above description of specific embodiments of the present invention, the features described and/or shown for one embodiment may be used in one or more other embodiments in the same or similar manner, be combined with features in other embodiments, or replace features in other embodiments.

It should be emphasized that the term "including/comprising" as used herein refers to the presence of a feature, element, step or component, but does not exclude the presence or addition of one or more other features, elements, steps or components.

In the above embodiments and examples, reference signs composed of numbers are used to indicate each step and/or unit. It should be understood by those ordinarily skilled in the art that, these reference signs are only for convenience of description and drawing, and do not indicate their order or any other limitation.

In addition, the methods of the present invention are not limited to being performed in the time order described in the specification, but may also be performed in other time order, in parallel, or independently. Therefore, the execution order of the methods described in this specification does not limit the technical scope of the present invention.

Although the present invention has been disclosed above by describing specific embodiments of the present invention, it should be understood that all the embodiments and examples described above are illustrative and not limitative. Those skilled in the art may design various modifications, improvements, or equivalents to the present invention within the spirit and scope of the appended claims. These modifications, improvements or equivalents should also be considered to be included within the protection scope of the present invention.

The invention claimed is:

1. An electronic device configured to act as a first-level spectrum management device for spectrum management, comprising:
 processing circuitry configured to:
 acquire an interference relationship between wireless access nodes managed by the first-level spectrum management device via a first and a second second-level spectrum management device different from the first second-level spectrum management device
 wherein the interference relationship is an inter-node interference estimated by the processing circuitry based on location information and configuration information of the wireless access nodes,
 wherein the wireless access nodes managed by the first-level spectrum management device comprise a first set of wireless access nodes which are managed by the first second-level spectrum management device and a second set of wireless access nodes which are managed by the second second-level spectrum management device;
 determine whether the first and second second-level spectrum management devices can coordinate usages of spectrums with each other,
 in a case where the determining determines that the first and second second-level spectrum management devices cannot coordinate usages of spectrums with each other;

based on the acquired interference relationship:
  allocate multiplexed spectrum resources for wireless access nodes, of the first and second sets of wireless access nodes, which do not interfere with each other in the frequency domain, and
  allocate orthogonal spectrum resources for wireless access nodes, of the first and second sets of wireless access nodes, which do interfere with each other in the frequency domain, and
in a case where the determining determines that the first and second second-level spectrum management devices can coordinate usages of spectrums with each other;
  allocate non-orthogonal spectrum resources for all wireless access nodes of the first and second sets based on the acquired interference relationship.

2. The electronic device according to claim 1, wherein the processing circuitry is further configured to: determine an overlapping area managed by the first and second second-level spectrum management devices, and with respect to the overlapping area, allocate multiplexed spectrum resources for the wireless access nodes which do not interfere with each other, and allocate orthogonal spectrum resources for the wireless access nodes which interfere with each other, based on the acquired interference relationship.

3. The electronic device according to claim 1, wherein the processing circuitry is configured to:
  create a structure graph of the wireless access nodes managed by the first-level spectrum management device based on the interference relationship, and
  perform the allocation of spectrum resources based on a chromatic number of the structure graph which is determined by a graph coloring method,
  wherein a side of the structure graph represents interference between the wireless access nodes.

4. The electronic device according to claim 3, wherein the processing circuitry is configured to:
  determine the chromatic number by regarding as a same co-existence group the wireless access nodes managed by the first and second second-level spectrum management devices which can perform the coordination.

5. The electronic device according to claim 3, wherein the wireless access nodes further comprise an independent wireless access node which is not managed by either the first or second second-level spectrum management device, and
  the processing circuitry is configured to determine the chromatic number by regarding the independent wireless access node as a separate co-existence group.

6. The electronic device according to claim 1, wherein the processing circuitry is further configured to:
  receive, from the first and second second-level spectrum management devices, information indicating whether the coordination can be performed, and allocate consecutive spectrum resources for the wireless access nodes managed by the first and second second-level spectrum management devices.

7. The electronic device according to claim 6, wherein the processing circuitry is configured to represent, by a pair of IDs of the first and second second-level spectrum management devices and 1, 0, whether the coordination is supported.

8. The electronic device according to claim 6, wherein the processing circuitry is further configured to:
  adjust an allocation manner of the spectrum resources, when a coordination state of the second-level spectrum management devices changes between an uncoordinated state to a coordinated state.

9. The electronic device according to claim 1,
  wherein the wireless access nodes operate as a secondary system, and a usage right of the secondary system with respect to the spectrum resources is lower than that of a primary system; and
  the first-level spectrum management device comprises a spectrum access system; and
  the first and second second-level spectrum management devices each comprises a co-existence manager; and
  the wireless access nodes comprises a citizens broadband radio service device.

10. A method by an electronic device configured to act as a first-level spectrum management device for spectrum management, the method comprising:
  acquiring an interference relationship between wireless access nodes managed by the first-level spectrum management device via a first and a second second-level spectrum management device different from the first second-level spectrum management device
  wherein the interference relationship is an inter-node interference estimated based on location information and configuration information of the wireless access nodes,
  wherein the wireless access nodes managed by the first-level spectrum management device comprise a first set of wireless access nodes which are managed by the first second-level spectrum management device and a second set of wireless access nodes which are managed by the second second-level spectrum management device;
  determining whether the first and second second-level spectrum management devices can coordinate usages of spectrums with each other,
  in a case where the determining determines that the first and second second-level spectrum management devices cannot coordinate usages of spectrums with each other;
  based on the acquired interference relationship:
    allocating multiplexed spectrum resources for wireless access nodes, of the first and second sets of wireless access nodes, which do not interfere with each other in the frequency domain, and
    allocating orthogonal spectrum resources for wireless access nodes, of the first and second sets of wireless access nodes, which do interfere with each other in the frequency domain, and
  in a case where the determining determines that the first and second second-level spectrum management devices can coordinate usages of spectrums with each other;
    allocating non-orthogonal spectrum resources for all wireless access nodes of the first and second sets based on the acquired interference relationship.

11. The method according to claim 10, further comprising:
  creating a structure graph of the wireless access nodes managed by the first-level spectrum management device based on the interference relationship,
  wherein a side of the structure graph represents interference between the wireless access nodes, and
  performing the allocation of spectrum resources is based on a chromatic number of the structure graph which is determined by a graph coloring method.

12. The method according to claim 11, further comprising:
  determining the chromatic number by regarding as a same co-existence group the wireless access nodes managed by the first and second second-level spectrum management devices which can perform the coordination.

13. The method according to claim 11, wherein the wireless access nodes further comprise an independent wireless access node which is not managed by either the first or the second second-level spectrum management device, and the chromatic number is determined by regarding the independent wireless access node as a separate co-existence group.

* * * * *